United States Patent [19]
Hansen et al.

[11] Patent Number: 5,498,404
[45] Date of Patent: Mar. 12, 1996

[54] PROCESS FOR THE STEAM REFORMING OF HYDROCARBONS

[75] Inventors: Jens-Henrik B. Hansen, Charlottenlund; Leif Storgaard, Herlev; Poul E. Jensen, Allerod, all of Denmark

[73] Assignee: Haldor Topsøe A/S, Denmark

[21] Appl. No.: 295,285

[22] Filed: Aug. 24, 1994

[30] Foreign Application Priority Data

Aug. 27, 1993 [DK] Denmark ................ 0974/93

[51] Int. Cl.$^6$ ................ C01B 3/40; C01B 3/26
[52] U.S. Cl. ................ 423/654; 423/652
[58] Field of Search ................ 423/652, 653, 423/658, 690, 651, 654; 502/331, 337, 345

[56] References Cited

U.S. PATENT DOCUMENTS

| | | | |
|---|---|---|---|
| 4,000,987 | 1/1977 | Okagami et al. | 48/214 A |
| 4,000,988 | 1/1977 | Uemoto et al. | 48/214 A |
| 4,142,962 | 3/1979 | Yates et al. | 208/109 |
| 4,985,231 | 1/1991 | Lywood | 423/652 |
| 5,004,592 | 4/1991 | Pinto | 423/652 |
| 5,026,536 | 6/1991 | Shioiri et al. | 423/652 |

*Primary Examiner*—Asok Pal
*Assistant Examiner*—Bekir L. Yildirim
*Attorney, Agent, or Firm*—Ostrolenk, Faber, Gerb & Soffen

[57] ABSTRACT

Process for catalytical steam reforming of a nitrogen containing carbonaceous feedstock with reduced formation of ammonia, wherein the feedstock is contacted with a supported nickel catalyst further including copper in an amount of 0.01–10% by weight calculated on the amount of nickel in the catalyst.

4 Claims, No Drawings

PROCESS FOR THE STEAM REFORMING OF HYDROCARBONS

BACKGROUND OF THE INVENTION

1. Field of the Invention

The present invention is related to the production of hydrogen and/or carbon monoxide rich gases by steam reforming of hydrocarbons. In particular, the present invention involves a copper containing nickel reforming catalyst for use in the steam reforming of a hydrocarbon feedstock.

2. Description of the Related Art

In the known processes for the production of hydrogen and/or carbon monoxide rich gases, a mixture of hydrocarbons and steam and/or carbon dioxide is passed at elevated temperature and pressure through a reactor packed with a catalyst, mainly consisting of nickel as the active catalytic component.

Hydrocarbon feedstocks suitable for steam reforming are for instance natural gas, refinery off-gases, propane, naphtha and liquified petroleum gases. Taking methane as an example, the reactions, which take place, can be represented by the following equations:

$$CH_4 + H_2O \rightarrow CO + 3H_2 \tag{1}$$

$$CH_4 + CO_2 \rightarrow 2CO + 2H_2 \tag{2}$$

$$CO + H_2O \rightarrow CO_2 + H_2 \tag{3}$$

Raw product gas leaving the steam reforming reactor is conventionally processed by condensation and liquid-gas phase separation treatment subsequent to the steam reforming. The liquid process condensate, mainly consisting of water, is then recycled back to the steam reforming section via a boiler for steam generation.

Prior to introduction into the boiler, the condensate has in many plants to be subjected removal of water soluble compounds and salts. For that purpose, the condensate is passed through a demineralization unit operating typically on ion-exchange resins.

A major problem in the conventional steam reforming process arises during purification of the process condensate, especially condensate from steam reforming of a feedstock with a high content of nitrogen, like natural gas from certain fields.

Nitrogen contained in the feedstock reacts with hydrogen to form ammonia by the reaction:

$$N_2 + 3H_2 \rightarrow 2NH_3 \tag{4}$$

when passing through a bed of nickel steam reforming catalyst. Ammonia in the raw product gas is almost quantitatively removed into the process condensate during processing of the gas. Amounts of ammonia of up to 300 parts per million in the process condensate are not unusual, when processing raw product gas from the steam reforming of natural gas.

Such high concentrations of ammonia demand frequent regeneration or renewal of expensive ion-exchange materials used for demineralisation of the process condensate, which is inconvenient to the operation of the steam reforming process.

SUMMARY OF THE INVENTION

Thus, it is the main object of this invention to prevent ammonia formation in the steam reforming of hydrocarbons without negatively affecting the overall process efficiency.

We have now observed that inclusion of copper in nickel steam reforming catalysts highly reduces formation of undesirable ammonia in steam reforming of nitrogen containing hydrocarbon feedstock. Though copper decreases the catalytic activity of the nickel catalysts slightly, the catalysts still provide sufficient effective activity for the steam reforming.

DETAILED DESCRIPTION OF THE PREFERRED EMBODIMENTS

Based on the above observation, a broad embodiment of the invention is directed towards a process for catalytically steam reforming a nitrogen containing carbonaceous feedstock with reduced formation of ammonia, wherein the feedstock is contacted with a supported nickel catalyst further including copper in an amount of 0.1–10% by weight calculated on the amount of nickel in the catalyst.

The copper containing nickel catalysts may be prepared by any of the methods conventionally used in the art, including impregnation of a refractory carrier material with a nickel and copper containing aqueous solution and calcinating the impregnated material in air.

Further methods comprise coprecipitation of soluble salts of carrier material, nickel and copper. Suitable salts are chlorides, nitrates, carbonates, acetates and oxalates, which upon heating in air form the oxides of the metals.

Carrier materials are conveniently selected from the group of alumina, magnesia, titania, silica, zirconia, beryllia, thoria, lanthania, calcium oxide and compounds or mixtures thereof. Preferred materials comprise alumina or magnesium aluminum spinel.

The actual amount of copper incorporated in the catalyst will depend on the content of nitrogen in the feedstock and on the amount of ammonia tolerated in the process condensate. Concentrations of copper between 0.1–0.5% by weight calculated on the total catalyst weight usually provide sufficient suppression of ammonia formation, resulting in ammonia concentrations below 50 ppm in the process condensate.

The nickel-copper catalysts are typically arranged as fixed bed in a tubular reforming reactor.

Depending on the nitrogen content in the feedstock and the ammonia concentration tolerable in the process condensate, it may be sufficient to arrange the nickel-copper catalysts as a sublayer in a fixed bed of conventional nickel steam reforming catalyst. Thereby, the nickel-copper catalyst layer preferably constitutes 25–75% of the catalyst bed.

The invention will be further described in the following Examples.

EXAMPLE 1

Intrinsic Activity

A series of nickel/copper catalyst samples containing 15% by weight of nickel and containing varying contents of copper were prepared by impregnation of a spinel carrier (MgAl2O4) with aqueous solutions of mixed nickel/copper nitrate. The impregnated carrier was finally calcined in air, whereby the nitrates decompose to oxides.

The catalysts were loaded in a reactor and activated during heating to 800° C. in a flowing mixture of equal amounts of steam and hydrogen at atmospheric pressure. During activation, the nickel/copper oxide on the carrier was reduced into the metallic state. The temperature was maintained at 800° C. for an additional 150 hours in order to allow for sintering of the catalysts as during industrial operation.

Following activation/sintering, the catalysts were removed from the reactor and crushed to a smaller particle size prior to determination of the intrinsic activity for methane steam reforming and for ammonia synthesis at the following conditions:

|  | methane steam reforming | ammonia formation |
|---|---|---|
| Catalyst size, mm | 0.3–0.5 | 0.3–0.5 |
| Catalyst amount, mg | 30.0–50.0 | 1000.0 |
| Temperature, °C. | 400–650 | 650–750 |
| Feed gas composition, Nl/h |  |  |
| CH4 | 4.0 | 0.0 |
| H2O | 16.0 | 16.0 |
| H2 | 1.6 | 30.0 |
| N2 | 0.0 | 10.0 |

The activities obtained at 650° C. are shown in Table 1.

TABLE 1

| | | Intrinsic activity at 650° C. | |
|---|---|---|---|
| | | Relative Activity | |
| 100*Cu/Ni weight/weight | | Methane Steam Reforming | Ammonia Formation |
| Cat. 1 | 0.00 | 100 | 100 |
| Cat. 2 | 0.20 | 77 | 59 |
| Cat. 3 | 0.67 | 72 | 44 |
| Cat. 4 | 1.33 | 70 | 28 |
| Cat. 5 | 3.33 | 50 | 11 |

In spite of the small catalyst size, the methane steam reforming reaction was subject to diffusion restrictions at 650° C., and, therefore, the activities given in Table 1 were obtained through extrapolation of the activities obtained at lower temperatures by means of the well known Arrhenius graph.

EXAMPLE 2

Bench-Scale Tests

Catalyst 1 and Catalyst 5 prepared as described in the above Example were further tested in a methane steam reforming bench-scale reactor operated with downflow at elevated pressure simulating industrial operation.

The catalysts were placed in the bottom 75% of the catalyst bed. The top 25% of the catalyst bed was in both tests loaded with the conventional nickel steam reforming catalyst R-67R available from Haldor Topsoe A/S, Denmark. The tests were carried out at the below conditions:

| Catalyst size, mm | 3.4–5.0 |
|---|---|
| Catalyst amount, g | 95.0 |
| Temp. in/out °C. | 500/865 |
| Pressure bar | 18.6 |
| Feed gas composition, Nl/h | |
| CH4 | 109.0 |
| H2O | 325.0 |
| H2 | 2.5 |
| N2 | 3.7 |

The results related to the observed ammonia formation are given in Table 2. The performance of the two different catalysts was otherwise undistinguishable.

TABLE 2

Ammonia formation during bench-scale methane steam reforming

| | Ammonia in process condensate ppm by weight | |
|---|---|---|
| Hours on Stream | Nickel Catalyst | Copper/Nickel Catalyst |
| 20 | 325 | 140 |
| 100 | 310 | 100 |
| 200 | 230 | 85 |
| 300 | 255 | 75 |
| 400 | 235 | 70 |
| 450 | 230 | 65 |

We claim:

1. Process for catalytic steam reforming of a nitrogen-containing hydrocarbon feedstock to produce hydrogen- and carbon monoxide-rich gasses with reduced formation of ammonia, wherein the feedstock is contacted with a support nickel catalyst further including copper in an amount of 0.01–10% by weight calculated on the amount of nickel in the catalyst, the copper being present to suppress the production of ammonia.

2. The process of claim 1, wherein the amount of copper in the catalyst is between 0.03–0.50% by weight calculated on the total catalyst weight.

3. The process of claim 1, wherein the copper containing nickel catalyst is arranged as a sublayer in a fixed bed of a conventional nickel steam reforming catalyst.

4. The process of claim 3, wherein the sublayer constitutes between 25% and 75% of the total catalyst bed.

* * * * *